(12) United States Patent
Wu et al.

(10) Patent No.: US 11,037,530 B2
(45) Date of Patent: Jun. 15, 2021

(54) VIDEO PROCESSING CIRCUIT AND METHOD FOR HANDLING MULTIPLE VIDEOS USING SINGLE VIDEO PROCESSING PATH CAPABLE OF INCREASING PROCESSING DATA RATE AND SAVING CIRCUIT AREA

(71) Applicant: Realtek Semiconductor Corp., HsinChu (TW)

(72) Inventors: Po-Hsien Wu, Hsinchu (TW); Yu-Pin Lin, Pingtung County (TW); Tien-Hung Lin, New Taipei (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/810,864

(22) Filed: Mar. 6, 2020

(65) Prior Publication Data

US 2020/0312278 A1 Oct. 1, 2020

(30) Foreign Application Priority Data

Mar. 26, 2019 (TW) ................................. 108110407

(51) Int. Cl.
*G09G 5/14* (2006.01)
*H04N 13/10* (2018.01)
*G06F 3/14* (2006.01)

(52) U.S. Cl.
CPC ............. *G09G 5/14* (2013.01); *G06F 3/1438* (2013.01); *H04N 13/10* (2018.05); *G09G 2310/0229* (2013.01)

(58) Field of Classification Search
None
See application file for complete search history.

(56) References Cited

U.S. PATENT DOCUMENTS

| | | |
|---|---|---|
| 9,756,318 B2 | 9/2017 | Jones |
| 2007/0103585 A1* | 5/2007 | Takeuchi ............... G09G 3/001 348/441 |
| 2008/0266305 A1 | 10/2008 | Cheng |
| 2014/0125556 A1 | 5/2014 | Roethig |

* cited by examiner

*Primary Examiner* — David D Davis
(74) *Attorney, Agent, or Firm* — Winston Hsu

(57) ABSTRACT

A video processing method for a video processing circuit includes receiving a first video source corresponding to a first pixel rate and a second video source corresponding to a second pixel rate, wherein a processing data rate of a video processing path is greater than or equal to a sum of the first pixel rate and the second pixel rate. The method further includes using the processing data rate to sequentially perform an image processing to a first image of the first video source and a second image of the second video source corresponding to the same display time, to generate a first processed image and a second processed image.

10 Claims, 5 Drawing Sheets

VIDEO PROCESSING CIRCUIT AND METHOD FOR HANDLING MULTIPLE VIDEOS USING SINGLE VIDEO PROCESSING PATH CAPABLE OF INCREASING PROCESSING DATA RATE AND SAVING CIRCUIT AREA

BACKGROUND OF THE INVENTION

1. Field of the Invention

The present invention relates to a video processing circuit and related method, and more particularly, to a video processing circuit and related method using single video processing path to process multiple videos.

2. Description of the Prior Art

For a display device capable of simultaneously displaying multiple videos, it is commonly configured with multiple video processing circuits to perform parallel image processing such as picture quality processing, scaling, gamut conversion, and de-interlacing. For example, a display device capable of picture-in-picture is configured with multiple video processing circuits to perform multiple images processing, so the display device may display multiple videos with the same picture quality.

However, in order to save an area of the video processing circuit to save cost, how to use single video processing circuit to perform multiple video processing has become a topic in the industry.

SUMMARY OF THE INVENTION

It is therefore an objective of the present invention to provide a video processing circuit and related method using single video processing path to process multiple videos.

The present invention discloses a video processing method for a video processing circuit. The method includes receiving a first video source corresponding to a first pixel rate and a second video source corresponding to a second pixel rate, wherein a processing data rate of a video processing path is greater than or equal to a sum of the first pixel rate and the second pixel rate. The method further includes using the processing data rate to sequentially perform image processing to a first image of the first video source and a second image of the second video source corresponding to the same display time, to generate a first processing image and a second processing image.

The present invention further discloses a video processing circuit including a first memory access unit configured to read a first video source corresponding to a first pixel rate and a second video source corresponding to a second pixel rate, wherein a processing data rate of a video processing path is greater than or equal to a sum of the first pixel rate and the second pixel rate. The video processing circuit further includes an image processing unit, coupled to the first memory access unit, and configured to use the processing data rate to sequentially perform image processing to a first image of the first video source and a second image of the second video source corresponding to the same display time, to generate a first processing image and a second processing image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
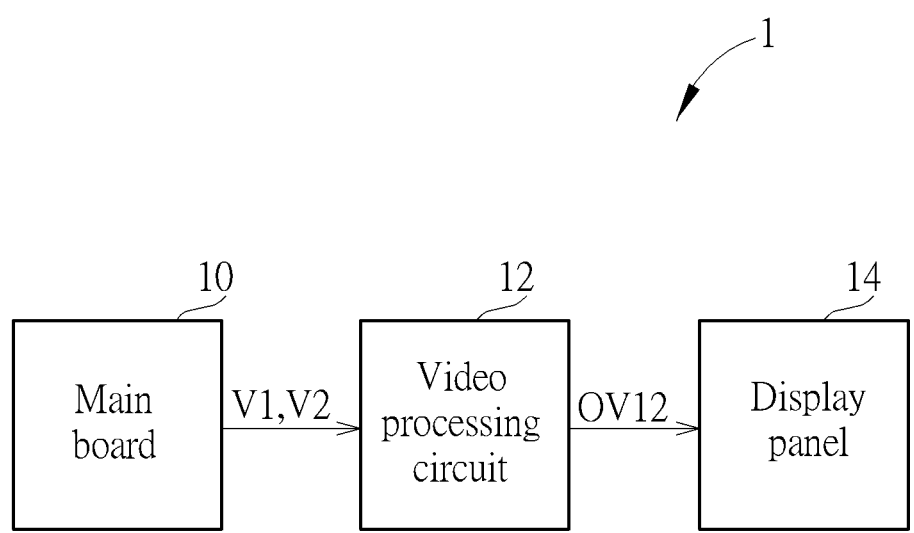
FIG. 1 is a functional block diagram of an electronic device according to an embodiment of the present invention.

FIG. 1 is a functional block diagram of an electronic device 1 according to an embodiment of the present invention. The electronic device 1 may be a television and set-top box set or a computer device, and includes a main board 10, a video processing circuit 12 and a display panel 14. The main board 10 is configured to transmit multiple video sources V1 and V2 to the video processing circuit 12, for example, a video source adaptive to HDMI (High Definition Multimedia Interface). The video processing circuit 12 is coupled to the main board 10 and the display panel 14, and configured to perform video processing to the multiple video sources V1 and V2, to generate a superimposed video OV12 to the display panel 14. The display panel 14 is configured to simultaneously display the superimposed video OV12, for example, a picture-in-picture frame or a frame including multiple distinct sub-frames.

Figure 2:
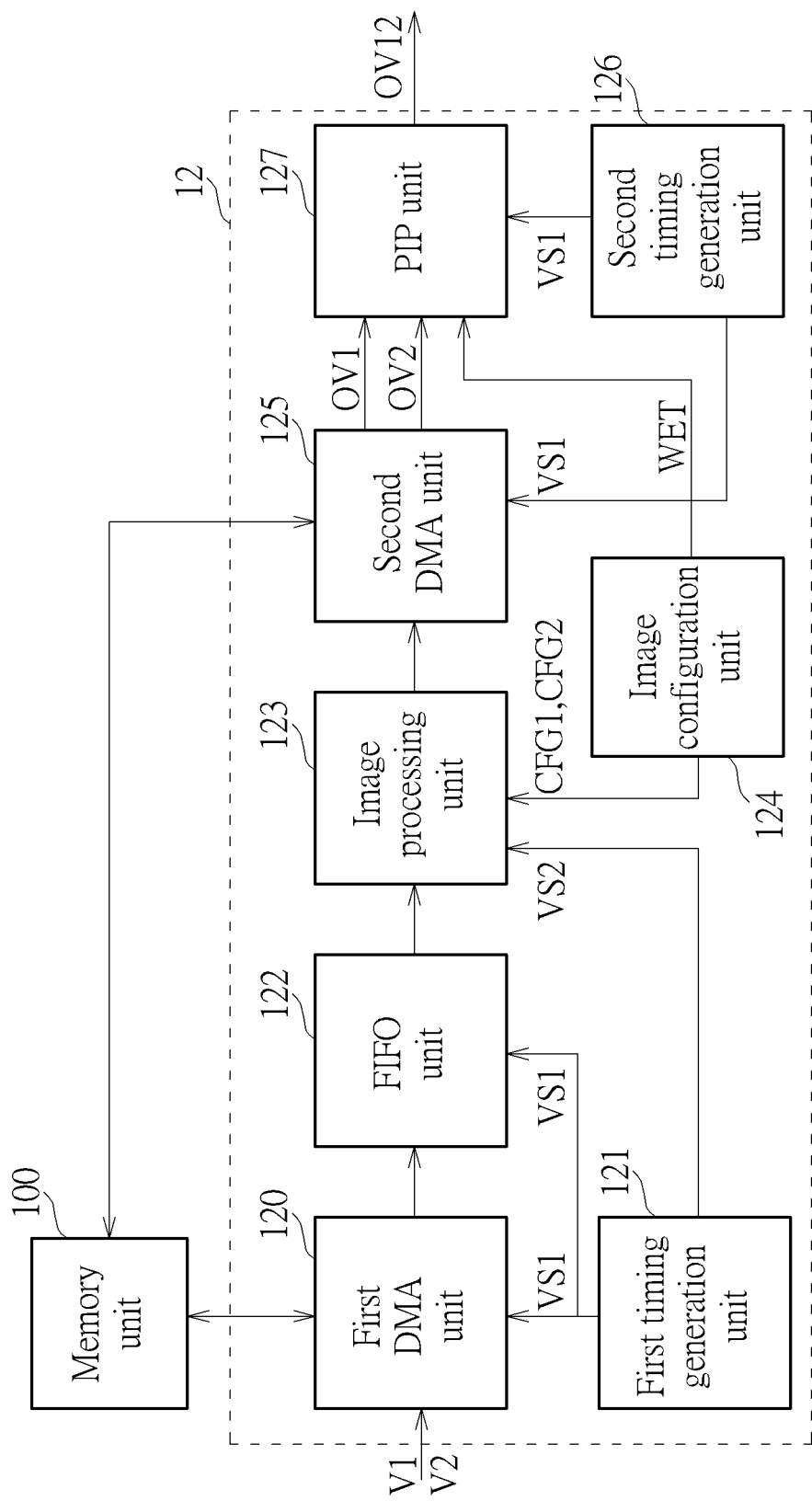
FIG. 2 is a functional block diagram of a video processing circuit and a memory unit according to an embodiment of the present invention.

FIG. 2 is a functional block diagram of a video processing circuit 12 and a memory unit 100 according to an embodiment of the present invention. The electronic device 1 further includes the memory unit 100 coupled to the video processing circuit 12. The video processing circuit 12 includes a first DMA (direct memory access) unit 120, a first timing generation unit 121, a FIFO (first-in-first-out) unit 122, an image processing unit 123, an image configuration unit 124, a second DMA unit 125, a second timing generation unit 126 and a PIP (picture-in-picture) unit 127. In another embodiment, the memory unit 100 may be integrated in the video processing circuit 12. In addition, the first DMA unit 120 and the second DMA unit 125 may be replaced by another type of memory access unit, e.g., a MMU (memory management unit) or an IOMMU (input-output memory management unit), which is not limited.

The memory unit 100 may be but not limited to a DDR SDRAM (Double Data Rate Synchronous Dynamic Random. Access Memory), and configured to store the multiple video sources V1 and V2 received by the video processing circuit 12. The first timing generation unit 121 is coupled to the first DMA unit 120, the FIFO unit 122 and the image processing unit 123, and configured to generate a first synchronization signal VS1 to the first DMA unit 120 and the FIFO unit 122, and generate a second synchronization signal VS2 to the image processing unit 123. The first DMA unit 120 is coupled to the memory unit 100, the first timing generation unit 121 and the FIFO unit 122, and configured to read the multiple video sources V1 and V2 from the memory unit 100 to the FIFO unit 122 according to the first synchronization signal VS1.

Figure 3:
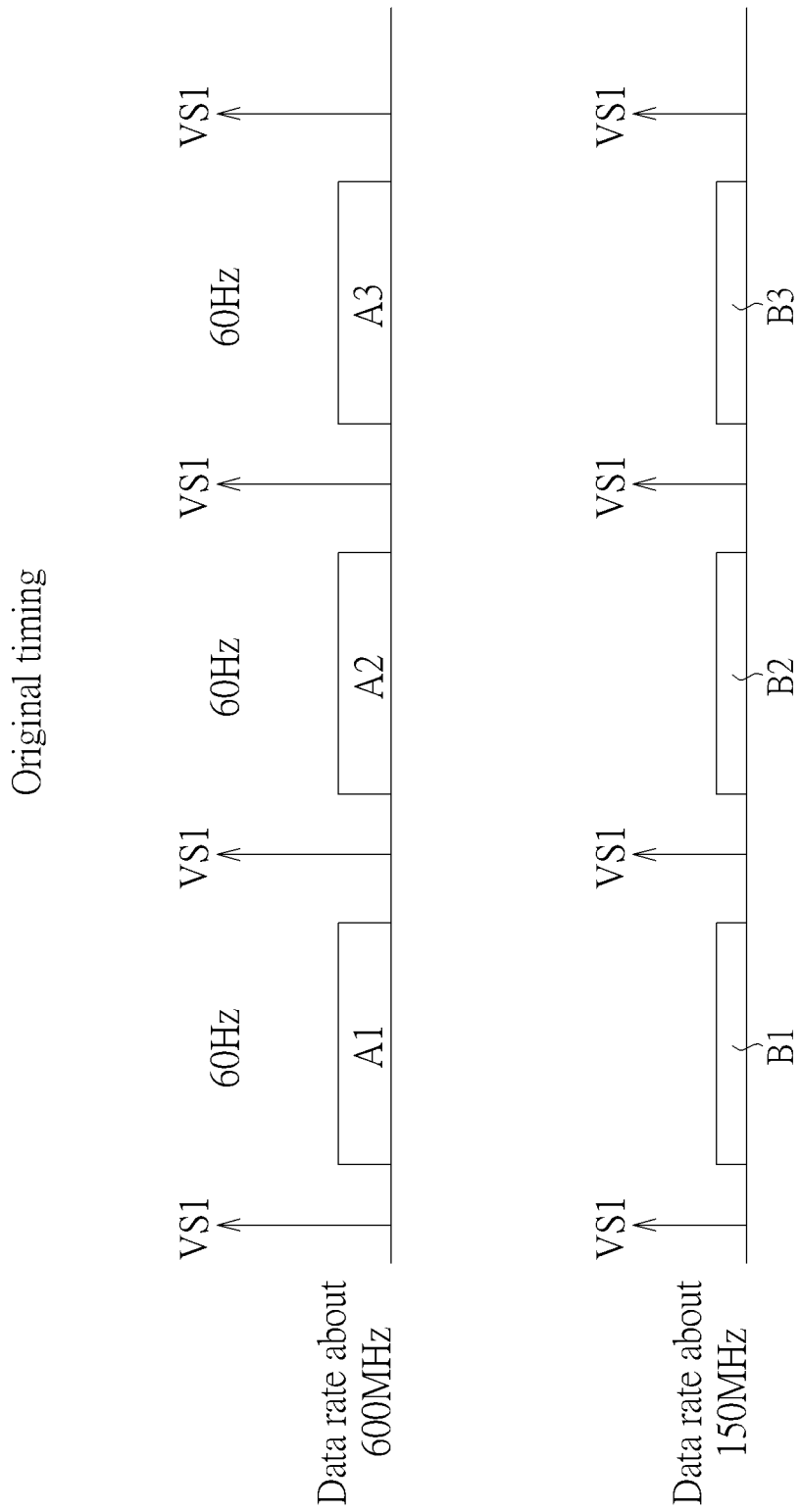
FIG. 3 is a schematic diagram of an original timing according to an embodiment of the present invention.

FIG. 3 is a schematic diagram of an original timing according to an embodiment of the present invention. The video source V1 includes at least multiple images A1, A2 and A3, while the video source V2 includes at least multiple images B1, B2 and B3. For example, the first DMA unit 120 may read the images A1 and B1 according to the first synchronization signal VS1 that is firstly received; and then read the images A2 and B2 according to the first synchronization signal VS1 that is secondarily received, and so forth. Note that images A1 and B1 correspond to the same display time (or the same frame) when displayed on display panel 14. Likewise, images A2 and B2 correspond to next display time.

The FIFO unit 122 is coupled to the image processing unit 123, and configured to sequentially output the images A1, B1, A2, B2, A3 and B3 read by the first DMA unit 120 to the image processing unit 123 according to the first synchronization signal VS1. In another embodiment of the present invention, the FIFO unit 122 may be integrated in the first DMA unit 120.

Figure 4:
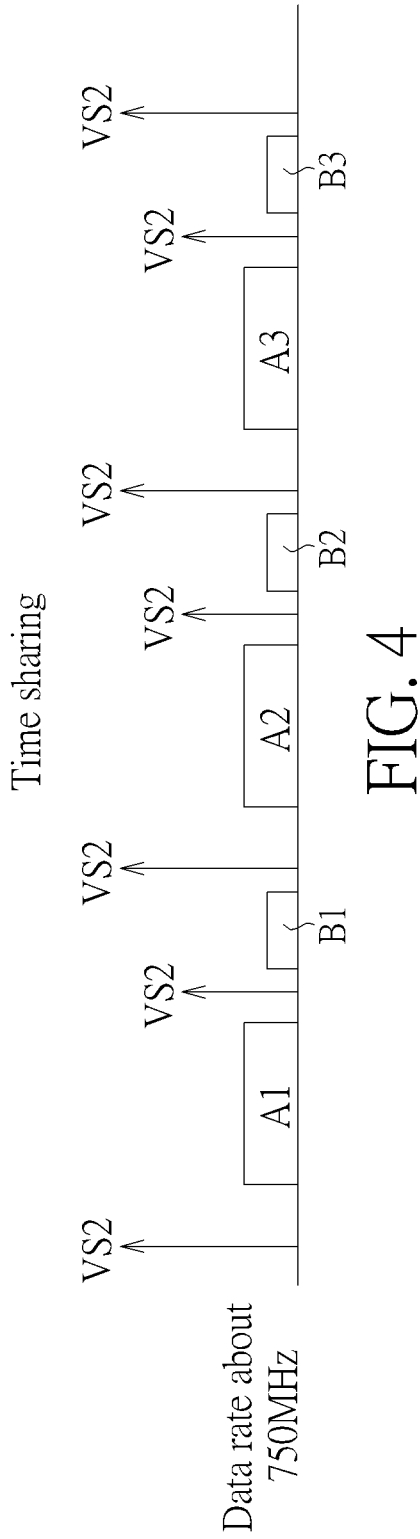
FIG. 4 is a schematic diagram of a time sharing according to an embodiment of the present invention.

The image processing unit 123 is coupled to the first timing generation unit 121, the FIFO unit 122, the image configuration unit 124 and the second DMA unit 125, and configured to sequentially perform image processing to the images A1, B1, A2, B2, A3 and B3 according to the second synchronization signal VS2, a first configuration CFG1 and a second configuration CFG2, so as to generate output videos OV1 and OV2. The image configuration unit 124 is configured to generate the first configuration CFG1 and the second configuration CFG2 to the image processing unit 123. FIG. 4 is a schematic diagram of a time sharing according to an embodiment of the present invention. For example, when the second synchronization signal VS2 is firstly received, the image processing unit 123 may perform image processing to the image A1 according to the first configuration CFG1; when the second synchronization signal VS2 is secondarily received, the image processing unit 123 may perform image processing to the image B1 according to the second configuration CFG2; when the second synchronization signal VS2 is thirdly received, the image processing unit 123 may perform image processing to the image A2 according to the second configuration CFG2; when the second synchronization signal VS2 is fourthly received, the image processing unit 123 may perform image processing to the image B2 according to the second configuration CFG2; and so forth. In one embodiment, the image processing unit 123 may perform image processing such picture quality processing, scaling, gamut conversion, and de-interlacing, which is not limited.

The second DMA unit 125 is coupled to the memory unit 100, the image processing unit 123, the second timing generation unit 126, the second timing generation unit 126 and the PIP unit 127, and configured to store processing results (i.e., the output videos OV1 and OV2) of the image processing unit 123 to the memory unit 100, and read the output videos OV1 and OV2 from the memory unit 100 to the PIP unit 127 according to the first synchronization signal VS1.

The PIP unit 127 is coupled to the second DMA unit 125 and the second timing generation unit 126, and configured to superimpose the superimposed output videos OV1 and OV2 according to the first synchronization signal VS1 and a weighting WET to generate a superimposed video OV12 to the display panel 14. In one embodiment, the weighting WET may indicate at least one of front and back (upper and lower) picture layers that are presented on the display panel 14, distributed proportion, distributed location and pixel blending proportions of the output videos OV1 and OV2, which is not limited.

In one embodiment, the superimposed video OV12 may be but not limited to: $OV1\_P(i)*WET(i)+OV2\_P(i)*(1-WET(i))$, wherein $OV1\_P(i)$ is an i-th pixel of the image A1, $OV2\_P(i)$ is an i-th pixel of the image B1, $WET(i)$ is a weighting corresponding to the i-th pixel of the images A1 and B1.

Figure 5:
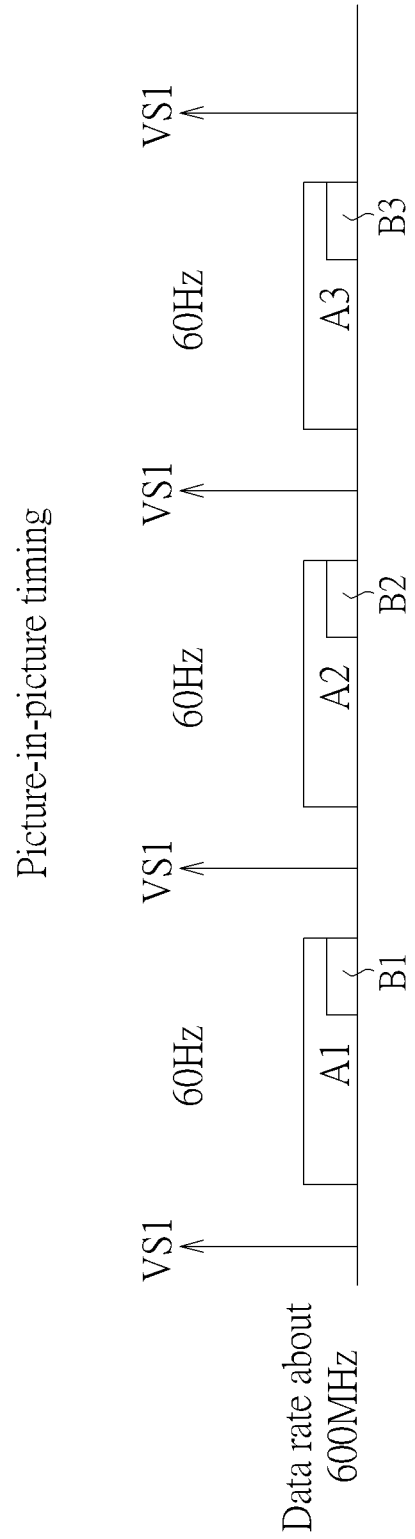
FIG. 5 is a schematic diagram of a picture-in-picture timing according to an embodiment of the present invention.

FIG. 5 is a schematic diagram of a picture-in-picture timing according to an embodiment of the present invention. Given that the weighting WET indicates the front and back (upper and lower) picture layers of the output videos OV1 and OV2 that are presented on the display panel 14, wherein the output video OV1 is at the back (lower) layer, and the output video OV2 is at the front (upper) layer. As shown in FIG. 5, the PIP unit 127 may sequentially output superimposed images (A1+B1), (A2+B2) and (A3+B3) according to the first synchronization signal VS1, so the display panel 14 may display picture-in-picture frames.

In FIG. 3, in the original timing, for example, regarding a processing path capability of 4K60 Hz, it can perform image processing to the images A1, A2 and A3 of the video source V1 with a pixel rate of 594 Mhz (4400*2250*60 Hz=594 Mhz), a frame resolution of 3840*2160 square pixel, a frame rate of 60 Hz. When the image processing unit 123 needs to support the processing path capability of 4K60 Hz, then a data rate is about 600 MHz. On the other hand, regarding a processing path capability of 2K60 Hz, it can perform image processing to the images B1, B2 and B3 of the video source V2 with a pixel rate of 148.5 Mhz, a frame resolution of 1920*1080 square pixel, and a frame rate of 60 Hz. When the image processing unit 123 needs to support the processing path capability of 2K60 Hz, then a data rate is about 150 MHz.

In FIG. 4, in the time sharing, when the image processing unit 123 needs to simultaneously support the processing path capabilities of 4K60 Hz and 2K60 Hz, then a processing data rate is about 600 MHz+150 Hz=750 Hz. In other words, when simultaneously process the video sources V1 and V2 with the frame rate of 60 Hz, the processing data rate of the image processing unit 123 may be configured to a sum of pixel rates of the video sources V1 and V2. Therefore, the image processing unit 123 may use a higher processing data rate (or pixel rate) to sequentially perform image processing to the images corresponding to the same display time. For example, a pixel rate of 750 MHz along with a frame rate of 60 Hz may be used to sequentially perform image processing to the images A1, B1, A2, B2, A3 and B3; wherein images A1 and B1 correspond to the same display time, and images A2 and B2 correspond to another display time.

In brief, the present invention utilizes time sharing to increase the processing data rate of the image processing unit to use single video processing path to perform image processing to multiple videos, so as to save circuit area and cost.

Further, the processing data rate of the image processing unit 123 is associated with a synthesis constraint of images. As can be seen from the embodiments of FIG. 3 and FIG. 4, the processing data rate of time sharing is about 750 MHz, which is 1.25 times of the processing data rate of 600 MHz of original timing. In other words, a synthesis constraint of time sharing is to increase a clock of the processing path capability of 4K60 Hz to a clock of 1.25 times.

In one embodiment, under time sharing, decreasing porch proportions of the video sources V1 and V2, e.g., by decreasing lengths of a horizontal front porch and a length of a horizontal back porch, or by decreasing numbers of a vertical front porch and a vertical back porch, a clock of the synthesis constraint may not be up to 1.25 times. For example, in the embodiment of FIG. 4, a porch proportion of 16% of the horizontal and vertical porches is decreased to be 6%, then the synthesis constraint is up to about 1.11 times, which may decrease a power consumption of the image processing unit 123 to save power.

In detail, in the embodiment of FIG. 3 under original timing, given that the image A1 has a horizontal and vertical display resolution of 3840*2160 square pixel, and the image A1 has a frame resolution (including displayed image and non-displayed porch) of 4400*2250 square pixel, then the porch proportion of the image A1 may be:

> 1−(3840*2160)/(4400*2250)=16%, and a synthesis clock for processing single pixel in each clock period may be 4400*2250*60 Hz=594 Mhz.

Given that the image B1 has a horizontal and vertical display resolution of 1920*1080 square pixels, and the image B1 has a frame resolution of 2200*1125 square pixels, then the porch proportion of the image B1 may be:

> (1920*1080/(2200*1125)=16%, and a synthesis clock for processing single pixel in each clock period may be 2200*1125*60 Hz=148.5 Mhz.

In the embodiment of FIG. 4 under time sharing, a porch proportion of the images A1 and B1 may be:

> 1−(3840*2160+1920*1080)/(4400*2250+2200*1125) =16%, and a synthesis clock for processing single pixel in each clock period may be (4400*2250+2200*1125)*60 Hz=742.5 Mhz.

In one embodiment, given that the horizontal and vertical frame resolution of the image A1 is decreased to 4000*2200 square pixels, the horizontal and vertical frame resolution of the image B1 is decreased to 2000*1100 square pixels, then under time sharing the porch proportion of the images A1 and B1 is decreased by:

> 1−(3840*2160+1920*1080)/(4000*2200+2000*1100) =6%, and a synthesis clock for processing single pixel in each clock period may be (4000*2200+2000*1100)*60 Hz=660 MHz.

Therefore, when the porch proportion is 16%, then the processing data rate 742.5 MHz under time sharing may be 1.25 times of the processing data rate 594 MHz under original timing (i.e., 742.5 MHz/594 MHz=1.25). When the porch proportion is decreased to 6%, then the processing data rate 660 MHz under time sharing may be 1.11 times of the processing data rate 594 MHz under original timing (i.e., 660 MHz/594 MHz=1.11).

Figure 6:
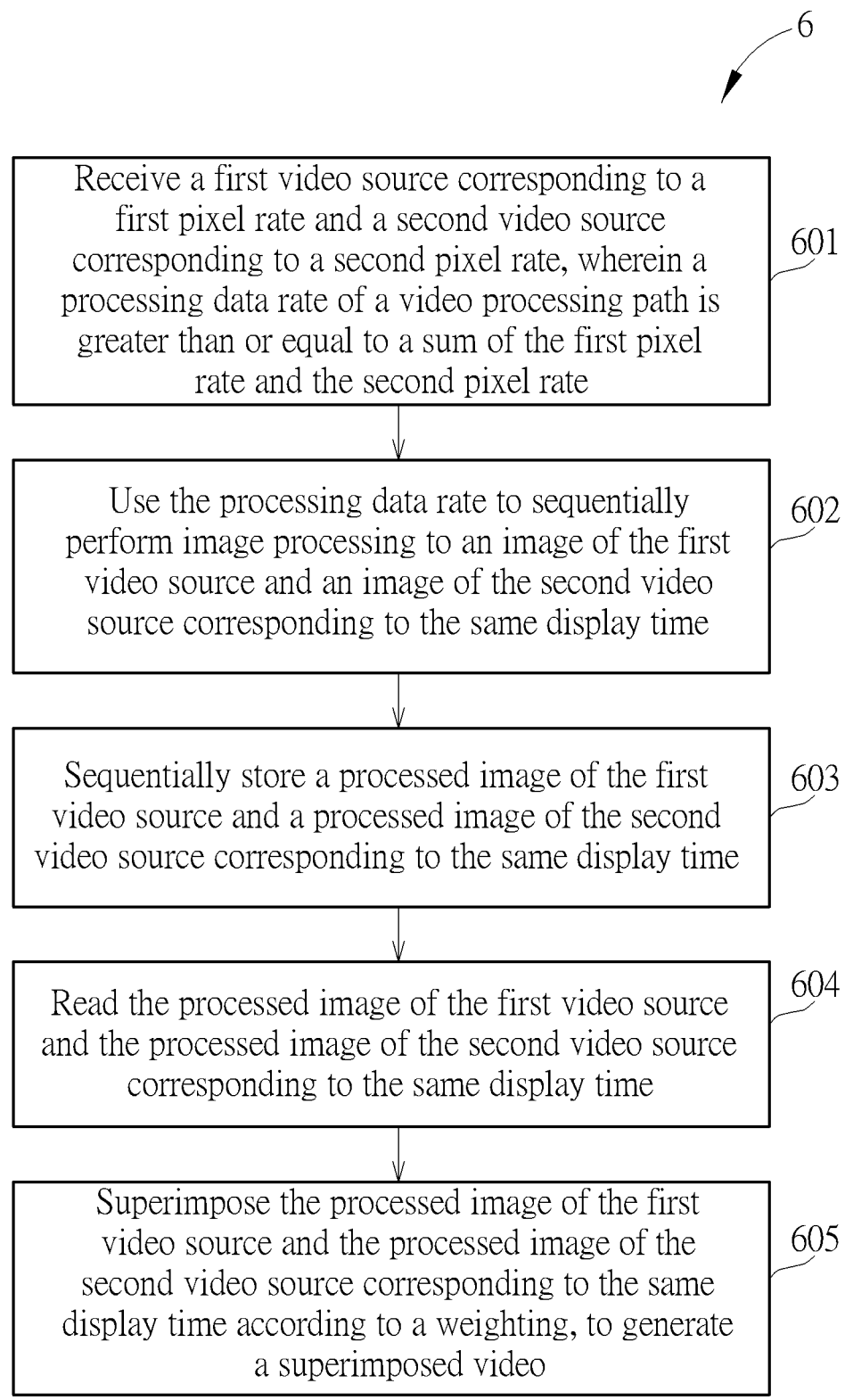
FIG. 6 is a flowchart of a video processing process according to an embodiment of the present invention.

Operations of the video processing circuit 12 may be summarized into a video processing process 6, as shown in FIG. 6, the video processing process 6 includes the following steps.

Step 601: Receive a first video source corresponding to a first pixel rate and a second video source corresponding to a second pixel rate, wherein a processing data rate of a video processing path is greater than or equal to a sum of the first pixel rate and the second pixel rate.

Step 602: Use the processing data rate to sequentially perform image processing to an image of the first video source and an image of the second video source corresponding to the same display time.

Step 603: Sequentially store a processed image of the first video source and a processed image of the second video source corresponding to the same display time.

Step 604: Read the processed image of the first video source and the processed image of the second video source corresponding to the same display time.

Step 605: Superimpose the processed image of the first video source and the processed image of the second video source corresponding to the same display time according to a weighting, to generate a superimposed video.

In Step 601, the first DMA unit 120 and the FIFO unit 122 receive the first video source V1 corresponding to the first pixel rate (600 MHz) and the second video source V2 corresponding to the second pixel rate (150 MHz) from the memory unit 100, wherein the processing data rate (750 MHz) of the video processing path is greater than or equal to the sum of the first pixel rate and the second pixel rate. In Step 602, the image processing unit 123 uses the processing data rate to sequentially perform image processing to the image A1 of the first video source V1 and the image B1 of the second video source V2 corresponding to the same display time. In one embodiment, the image processing unit 123 may decrease horizontal and vertical porches of the images A1 and B1 before perform image processing, which may decrease a synthesis constraint clock of the image processing unit 123.

In Step 603, the second DMA unit 125 sequentially stores the image A1 of the first video source V1 and the image B1 of the second video source V2 corresponding to the same display time to the memory unit 100. In Step 604, the second DMA unit 125 simultaneously reads the image A1 of the first video source V1 and the image B1 of the second video source V2 corresponding to the same display time from the memory unit 100. In Step 605, the PIP unit 127 superimposes the image A1 of the first video source V1 and the image B1 of the second video source V2 corresponding to the same display time according to weighting WET, so as to generate the superimposed video OV12.

To sum up, under time sharing, the present invention increases the processing data rate of the image processing unit to use single video processing path to process multiple videos, so as to save circuit area and cost. In one embodiment, under time sharing decreasing the porch proportions of the video image may decrease a clock proportion of synthesis constraint (i.e., the proportion between the processing data rate under time sharing and the processing data rate under original timing), which may decrease a power consumption of the image processing unit to save power.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video processing method, for a video processing circuit, comprising:
   receiving a first video source corresponding to a first pixel rate and a second video source corresponding to a second pixel rate, wherein a processing data rate of a video processing path is greater than or equal to a sum of the first pixel rate and the second pixel rate; and
   using the processing data rate to sequentially perform image processing to a first image of the first video source and a second image of the second video source corresponding to a same display time, to generate a first processing image and a second processing image.

2. The video processing method of claim 1, further comprising:
   sequentially storing the first processing image and the second processing image; and
   superimposing the first processing image and the second processing image corresponding to the same display time according to a weighting to generate a superimposed video.

3. The video processing method of claim 1, further comprising:
   decreasing a frame resolution of the first image and a frame resolution of the second image corresponding to the same display time to perform image processing.

4. The video processing method of claim 1, wherein the image processing comprises a least one of a picture quality processing, a scaling, a gamut conversion and a de-interlacing.

5. The video processing method of claim 1, further comprising:
   when a synchronization signal is firstly received, performing image processing to the first image according to a first configuration, to generate the first processing image; and
   when the synchronization signal is secondarily received, performing image processing to the second image according to a second configuration, to generate the second processing image.

6. A video processing circuit, comprising:
   a first memory access unit configured to read a first video source corresponding to a first pixel rate and a second video source corresponding to a second pixel rate, wherein a processing data rate of a video processing path is greater than or equal to a sum of the first pixel rate and the second pixel rate; and
   an image processing unit, coupled to the first memory access unit, and configured to use the processing data rate to sequentially perform image processing to a first image of the first video source and a second image of the second video source corresponding to a same display time, to generate a first processing image and a second processing image.

7. The video processing circuit of claim 6, further comprising:
   a second memory access unit coupled to the image processing unit, and configured to sequentially store the first processing image and the second processing image corresponding to the same display time to a memory unit; and
   a picture-in-picture unit coupled to the second memory access unit, and configured to superimpose the first processing image and the second processing image corresponding to the same display time according to a weighting, to generate a superimposed video.

8. The video processing circuit of claim 6, wherein the image processing unit is configured to decrease a frame resolution of the first image and a frame resolution of the second image corresponding to the same display time to perform image processing.

9. The video processing circuit of claim 6, wherein the image processing comprises a least one of a picture quality processing, a scaling, a gamut conversion and a de-interlacing.

10. The video processing circuit of claim 6, further comprising:
    a first timing generation unit coupled to the first memory access unit and the image processing unit, and configured to generate a synchronization signal to the first memory access unit and the image processing unit;
    when a synchronization signal is firstly received by the image processing unit, performing image processing to the first image according to a first configuration, to generate the first processing image;
    when the synchronization signal is secondarily received by the image processing unit, performing image processing to the second image according to a second configuration, to generate the second processing image.

* * * * *